United States Patent [19]

Sunavala

[11] Patent Number: 5,723,094
[45] Date of Patent: Mar. 3, 1998

[54] REACTOR FOR CHEMICAL REACTIONS

[75] Inventor: Kaizad Sunavala, Exton, Pa.

[73] Assignee: ARCO Chemical Technology, L.P., Greenville, Del.

[21] Appl. No.: 741,180

[22] Filed: Oct. 29, 1996

[51] Int. Cl.$^6$ .................................................. B01J 8/04
[52] U.S. Cl. .................................................. 422/197
[58] Field of Search .................................................. 422/197

[56] References Cited

U.S. PATENT DOCUMENTS 5,266,281 11/1993 Kao et al. .......................... 422/197
5,286,455 2/1994 Eilers et al. ........................ 422/110
5,445,799 8/1995 McCants ............................ 422/146
5,470,360 11/1995 Sederquist .......................... 48/94

*Primary Examiner*—Edward J. Cain
*Attorney, Agent, or Firm*—Jonathan L. Schuchardt

[57] ABSTRACT

This invention relates to a chemical reactor design which reduces localized zones of concentration in the reactor and accomplishes near perfect mixing conditions with the use of a series of plug flow capillary reactors. Due to the reactor design, the sequencing of reactions is improved and throughput increased.

12 Claims, 2 Drawing Sheets

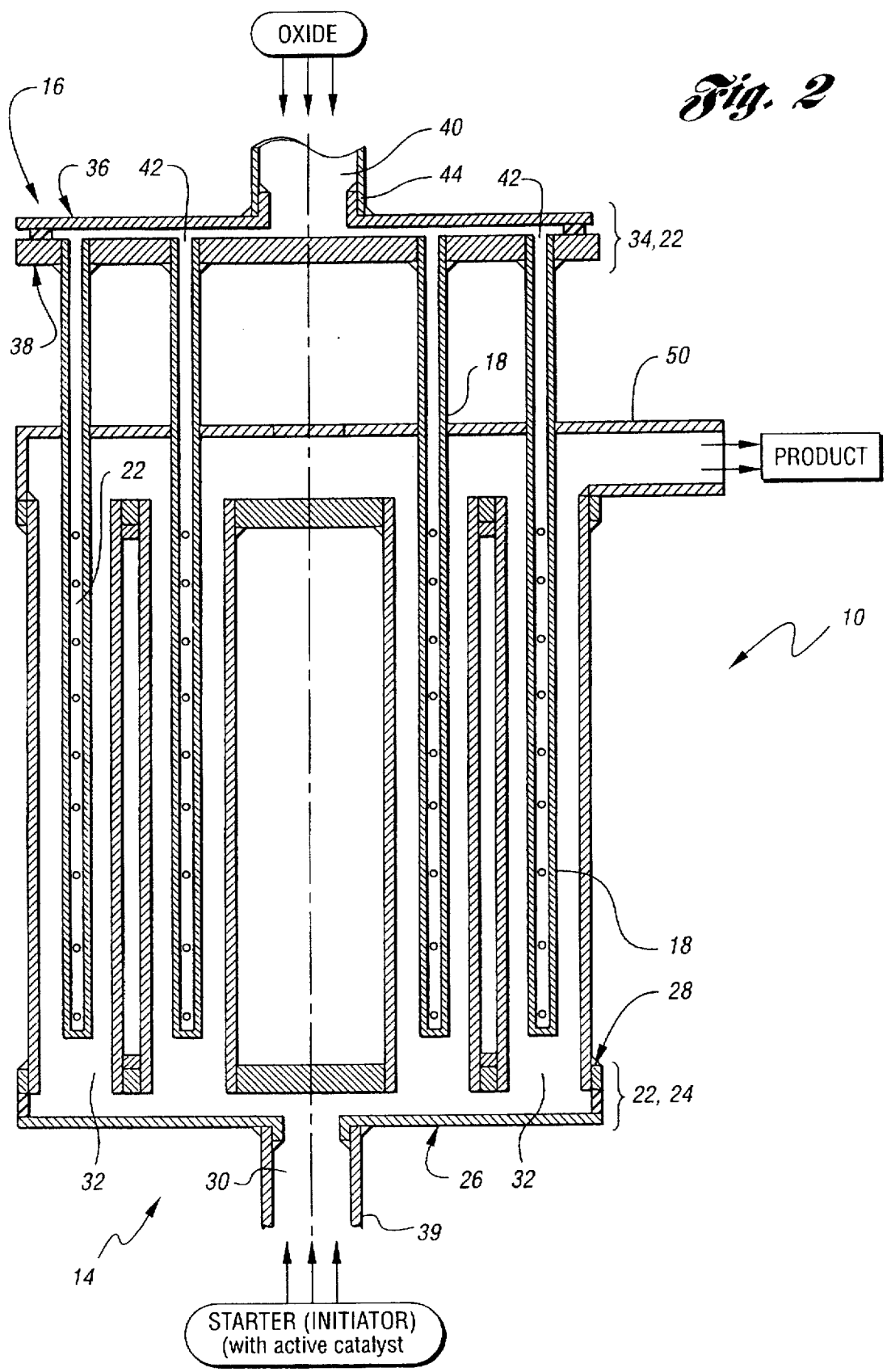

REACTOR FOR CHEMICAL REACTIONS

TECHNICAL FIELD

The present invention pertains to a reactor, for chemical reactions, designed to reduce localized zones of concentration and achieve near perfect micro-mixing conditions to increase reaction selectivity to desired products, while capable of maintaining near ideal plug flow conditions.

BACKGROUND ART

Reactors lie at the center of chemical processing plants. By manipulating the operating parameters and configuration of a reactor, a desired product can be produced in an efficient and economical fashion. The interactive effects of mixing, heat, mass transfer and kinetics are crucial elements in formulating reactors for a particular process. Reactor technology thus focuses on the requirements for adding and removing reactants and products, maintaining a desired heat level, accommodating phase changes and material transfers, assuring contact among reactants and providing for changing catalyst needs.

In particular, mixing is an important parameter that affects product distributions for multi-sequence reactions, such as those conducted in a semi-batch reactor. Although perfect mixing conditions are often assumed, such conditions generally do not exist. A departure from perfect mixing conditions results in variations in product sequencing and selectivity of a product. Under perfect mixing conditions, for a sequence reaction of the type:

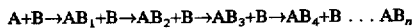

the rate of addition has no effect. As a result, under perfect mixing, the products are formed in perfect sequence, i.e. the mono adduct is formed first, followed by the di-adduct, then the tri-adduct, and so on. In contrast, under imperfect mixing conditions, the rate of addition of reagent B affects product sequencing and causes a reversal in the expected sequence. Under such conditions, at the points of addition, localized concentration fields of reagent B develop within the reactor and as the degree of localization increases, the spread of product distribution has been demonstrated to be wider. Such concentration fields are laden with reactants and thus the composition of the reactor fails to be uniform throughout. Over time these localized concentration fields lead to incomplete reactant conversion which skews reaction pathways and selectivity to desired products. For example, polymer molecular weight distributions (polydispersities) may be broadened unacceptably.

To determine the impact of imperfect mixing, micro-mixing, or the effect of mixing at a molecular level, may be evaluated for a given rate of reaction. Jacque Villermaux et al. have published papers regarding the effects of micro-mixing, and has introduced the concept of segregation index $X_s$, based on the sequence reaction above, a measure of the relative amount of B going to the adduct A, $AB_1$. As a result of increasing the micro-mixing efficiency, the segregation index in the case of consecutive competing reactions improves. In the example stated above, there are a series of multiple reactions, and the different adducts A, $AB_1$, $AB_2$, $AB_3$, ... $AB_{n-1}$ are competing with species B at the same time. Under perfect mixing conditions, each adduct has a chance of reacting with species B as determined by its kinetic rate constant. In the presence of imperfect mixing, the success of species B to react with the various adducts is strongly influenced by the degree of localization. Under imperfect conditions, product distribution is generally not the same as expected by the kinetic weight constant. Accordingly, micro-mixing efficiency is an important element to achieve selectivity of a desired product.

Micro-mixing is particularly useful in conjunction with the preparation of polymers. As an example, Arco Chemical has designed a continuous process for the preparation of polyoxyalkylene polyethers using double metal cyanide (DMC) catalysts as the polyoxyalkylation catalyst. This process uses a continuous addition of alkylene oxide in conjunction with the continuous addition of starter to a continuous oxyalkylation reactor. The presence of low molecular weight species during the majority of the polyoxyalkylation is believed to substantially eliminate extremely high molecular weight fractions having molecular weights greater than 100,000 Da without appreciably broadening molecular weight distribution. Product sequencing for such reactions is important to increase production of the desired product. The resultant polyether products make exceptional surfactants and are particularly useful in polymer forming systems, for example, polyurethanes. Additionally, this DMC catalyzed continuous process for polyol preparation exhibits extremely rapid reaction rates.

In general, it is desirable to produce large quantities of polyether product with exceptionally low unsaturation, close to nominal functionality, and low polydispersity. It is further desirable to prepare ultra-low unsaturation polyether products in a continuous process without forming significant quantities of ultra-high molecular weight fractions. Perfect mixing conditions are desired in order to maximize the properties identified above. However, for rapid reactions, such as these conducted in a large batch reactor, perfect mixing conditions are difficult to achieve. While the degree of micro-mixing may be improved by adding more spargers, better impeller designs, and baffles, unless the selectivity of the catalyst is modified or the kinetic rate constants are changed, it is unlikely that the desired degree of mixing perfect mixing can be achieved in a stirred tank reactor. There is a need for rapid reactions, such as DMC catalyzed oxyalkylation and polymerizations, to design a reactor which increases the efficiency of micro-mixing to obtain perfect mixing conditions and insures proper product sequencing.

To develop an ideal mixing reactor, four objectives should be met: (1) maximized micro-mixing efficiency; (2) back mixing elimination; (3) increased radial mixing; and (4) increased heat removal capability per unit volume of the shell, the latter to eliminate hot zones. In polymerization reactions, these four factors are important to achieve perfect mixing. Theoretically, an ideal stirred tank reactor is the best candidate to carry out a perfect mixing reaction. However, as the reaction rates become faster and reactor volume increases, it becomes progressively more difficult to design a perfect mixing vessel on a larger scale.

While a single plug flow reactor or a single continuous flow stirred tank (CSTR) reactor have often been used in continuous processes, such reactors have several limitations. For instance, with a CSTR, mechanical or hydraulic agitation is necessary to achieve a uniform composition and temperature. With a CSTR, reactants are continuously added and products continuously withdrawn from a stirred vessel. Accordingly, since the product mixtures are withdrawn from compositions within the reactor, the reactant concentrations which drive the reaction are necessarily low, and a CSTR thus generally requires the largest volume of the different reactor types.

Accordingly, there is a need for a reactor which can maximize mixing taking into consideration micro-mixing efficiency, back-mixing, radial-mixing and heat zones while keeping the volume of the reactor at a practical size, and allowing for continuous production of product.

SUMMARY OF THE INVENTION

It is an object of the present invention to provide a reactor that approaches perfect mixing with the use of a network of multiple plug flow reactors to increase the efficiency of micro-mixing. It is also an object of the present invention to provide a reactor which allows for continuous polymer production while decreasing the product distribution spread. It is an additional object of the present invention to provide a reactor designed to decrease the presence of localized zones of reaction without the use of major rotating parts. It is a further object of the present invention to provide a reactor in which the temperature of the reactor can be controlled to minimize localized fields of concentration. It is an additional object of the present invention to provide a reactor design which is flexible to allow flow rates and flow directions within the reactor to be altered. It is yet another object of the present invention to provide a reactor designed to improve radial mixing of the reactants, eliminate back mixing and improve segregation of reaction zones to increase the efficiency of micro-mixing.

In carrying out the above objects, the present invention pertains to a reactor for increasing the efficiency of chemical reactions, particularly polymerization reactions, with the use of a network of capillary plug flow reactors assembled in a single, compact reactor. A network of capillary plug flow reactors is created with the use of a series of flow tubes assembled in the reactor shell and connected to a source for the first reactants. Each of the flow tubes has encapsulated therein a capillary tubelet and each capillary tubelet is in turn connected to a source for the second reactants. To allow communication between the capillary tubelet and the flow tube, there is formed a plurality of apertures along the capillary tubelet. With this design, the second reactant is sparged into the one or more flow tubes for reaction with the first reactant, to create the desired product. In essence, at each of the apertures of the capillary tubelet there is created a discrete plug flow reactor. The combination of discrete plug flow reactors at each of the apertures forms a grid of plug flow reactors within the reactor to reduce localized zones of concentration and achieve near perfect mixing conditions. With the use of this reactor design, reactant conversion and selectivity to desired products is significantly increased.

The objects, features and advantages of the present invention are readily apparent from the following detailed description of the best mode for carrying out the invention when taken in connection with the accompanying drawings.

BRIEF DESCRIPTION OF THE DRAWINGS

FIG. 2 illustrates a cross-section drawing of the reactor of FIG. 1;

BEST MODE FOR CARRYING OUT THE INVENTION

In an effort to meet the above unresolved needs, the present invention outlines a network of plug flow reactors assembled in a compact vessel. This design allows for continuous production, and improves heat transfer in the reactor, by providing a greater surface area per unit volume ratio. This invention decreases the degree of localization and thus decreases the spread of product distribution. This design further requires no major rotating parts or moving equipment, such as agitators, baffles or impellers. This design further allows great flexibility as flow rates can be changed and flow directions can be altered from counter current or co-current. Additionally, the reactor is compact, easy to assemble, easy to clean, and relatively inexpensive from a production standpoint. Furthermore, due to the compact size, the reactor requires less dedicated area than conventional plug flow and batch reactors, which in-turn amounts to a cost savings.

Figure 1:
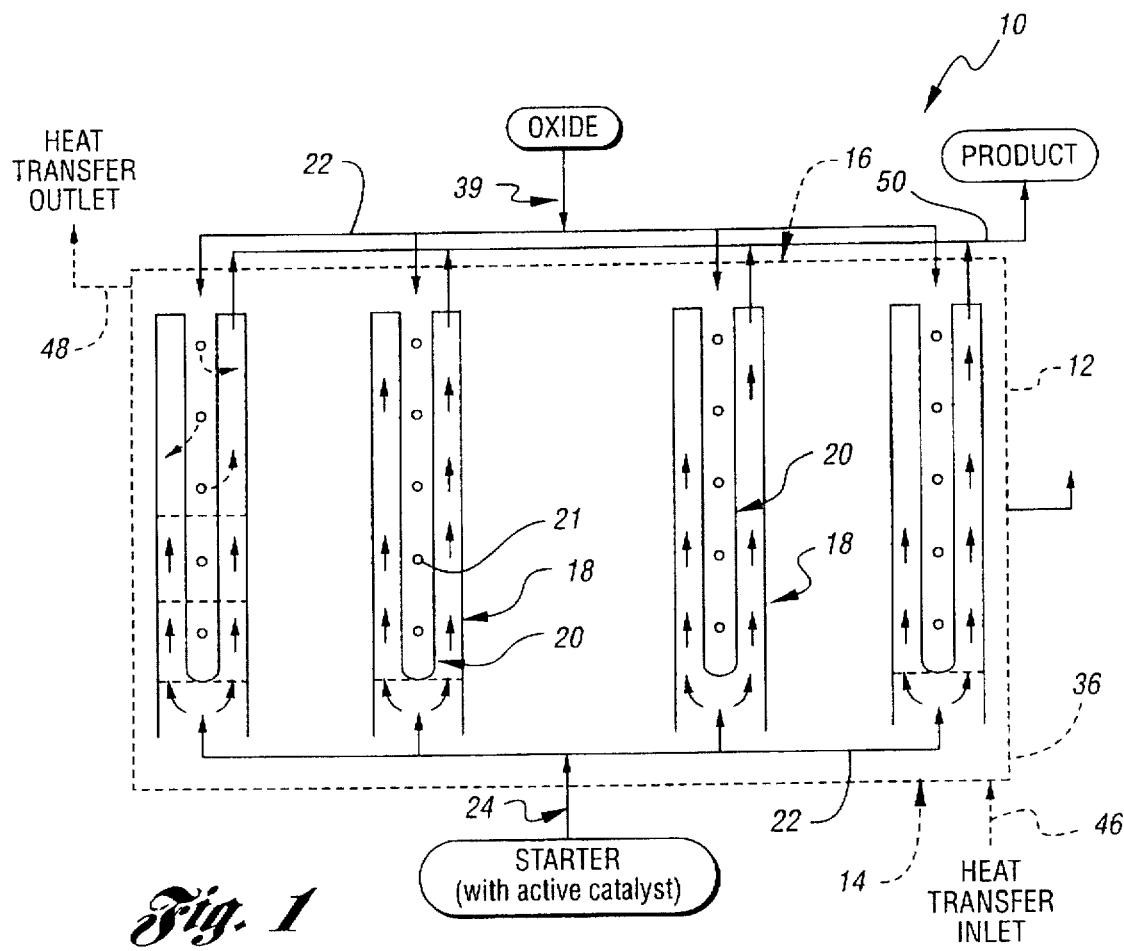
FIG. 1 illustrates a schematic representation of one embodiment of a reactor in accordance with the subject invention.

Referring to FIG. 1, there is shown a schematic diagram of one embodiment of a reactor 10 in accordance with the present invention. The reactor 10 includes a shell 12, preferably having a first end 14 and a second end 16. The shell 12 may be designed in a variety of sizes and shapes to accommodate a particular application. Accordingly, the volume of the shell 12 can vary from 50 gallons to 25,000 gallons (190 L to 95,000 L). For a lab reactor, a 50–100 gallon (190 L to 379 L) reactor may be appropriate. In contrast, a large-scale commercial reactor may require a volume between 1,000 gallons and 25,000 gallons (3,790 L and 95,000 L) depending on the requirements for a particular reaction. A preferred volume for a commercial reactor is approximately 5,000 gallons (1,900 L). Likewise, the diameter of the reactor can also vary from 2 ft to 16 feet (0.61 m to 4.88 m) based on the purpose of the reactor. For a commercial reactor, a diameter of 8 ft. (2.44 m) is preferred. Lastly, while many materials are suitable, the shell 12 is preferably constructed from carbon steel.

Positioned within the shell 12 there is at least one flow tube 18, such that the one or more flow tubes are connected to a source of first reactant(s). In general, to obtain perfect mixing conditions and create a network of plug flow reactors, a plurality of flow tubes is recommended, preferably in excess of 5 or more preferably in excess of 10. Nonetheless, it is feasible that the number of flow tubes could vary from 1 to 100 within a reactor 10. The number of flow tubes selected will depend on the overall size of the shell and the level of micromixing desired. This invention is contemplated to include a reactor having one flow tube with a plurality of capillary tubelets therein to achieve an alternate design for a network of plug flow reactors.

The term reactants as used throughout this specification is intended to include inert solvents, catalysts, etc. This invention further contemplates the use of one or more reactants combined to constitute a reactant(s).

The construction of the flow tubes will also vary depending on the reactants and the overall requirements of the chemical reaction. Since the flow tube is in direct contact with the reactants, the flow tube is preferably a carbon steel or a stainless steel, such as stainless steel 304 or 316. The length of the flow tube may be adjusted to suit a particular reaction. The flow tube length may thus vary between 3 feet and 17 feet (0.91 m and 5.18 m). As the flow tube length is directly proportional to a reactor's segregation index, if increased segregation is desired, the flow tube length may be accordingly increased. Of course the length of the flow tubes will have to fall within the constraints for a given application.

With a plurality of flow tubes, the arrangement of the flow tubes also affects mixing within the reactor. As an example, the flow tubes are preferably arranged to have a fixed pitch. For this reactor design, pitch is defined as the layout of the flow tubes 18 from a plan view. The flow tubes are preferably arranged to have a triangular or rectangular pitch and thus the flow tubes are arranged in the form of a triangle or rectangle. In this way the reactant distribution follows an orderly pattern. In addition, the flow tubes are preferably spaced from diameter to diameter approximately six inches to one foot (15.24 cm to 30.5 cm) apart. In a more preferred embodiment, there is a distance of six to eight inches (15.24 cm to 20.32 cm) from diameter to diameter. In general, the number of flow tubes is maximized within the shell to provide a true network of plug flow reactors and a reactor which approaches perfect mixing conditions. Lastly, the flow tubes are preferably placed parallel to one another to create a parallel network of plug flow reactors within the shell 12. Throughout this application, the term parallel flow tubes is intended to mean a set of flow tubes that are oriented in a parallel fashion. Accordingly, each flow tube be may be spiralled or curved and still oriented parallel to the other flow tubes in the reactor.

As provided in FIG. 1, a capillary tubelet 20 is positioned within and along a substantial fraction of the length of the flow tube such that each capillary tubelet 20 is connected to a source of second reactants. The capillary tubelet is preferably, but not necessarily, concentrically positioned within the flow tube 18. As depicted in FIG. 1, along each of the capillary tubelets 20 there are a plurality of apertures 21. The apertures allow for communication between the interior of the capillary tubelet and the interior of the flow tube in which the capillary tubelet is housed. Accordingly, with this reactor design, at each of the apertures along the capillary tubelet, there is created a discrete plug flow reactor. The reactor is thus made up of a mesh of plug flow reactors which together improve mixing conditions in the reactor.

As with the construction of the flow tubes, the capillary tubelets may be fabricated to suit the specifications for a particular reaction and set of operating parameters. Depending on the size of the reactor and the size of the flow tubes, the capillary tubelet may have a diameter ranging from $\frac{1}{8}$ inch to 2 inches (0.32 cm to 5.08 cm). For a lab reactor, the diameter of a capillary tubelet may be approximately $\frac{1}{4}$ inch (0.64 cm). In contrast, for a commercial reactor the diameter of a capillary tubelet may vary optimally from $\frac{3}{4}$ inch to 1 inch (1.9 cm to 2.54 cm). The length of the capillary tubelet also depends on the length of the flow tubes. In general, the length of the capillary tubelet preferably ranges from 8 ft. to 16 ft. (2.44 m to 4.88 m). In a more preferred embodiment, the capillary tubelet is approximately 12 ft. long (3.66 m).

To further set flow patterns within the flow tubes and provide a specific segregation index, the spacing and size of the apertures along the capillary tubelet may be adjusted. The diameter of the apertures along the capillary tubelet range from $\frac{1}{32}$ inch to $\frac{1}{4}$ inch (0.79 mm to 0.64 cm). For commercial reactors, a diameter of $\frac{1}{16}$ to $\frac{1}{8}$ inch (0.16 cm to 0.32 cm) is preferred. The spacing between apertures preferably varies from 2 inches to 6 inches (5.08 cm to 15.24 cm). The spacing of the apertures directly affects the reactor's segregation index. Since an increased segregation index increases the efficiency of micromixing within the reactor, the apertures are preferably spaced at a distance sufficient to allow adequate mixing at each aperture without back mixing so that each aperture acts as a discrete plug flow reactor. Additionally, the flow tube and capillary tubelet is preferably sized so that the diameter of the annular region of the flow tube around the capillary tubelet is no more than $\frac{1}{2}$ inch to 4 inches (1.27 cm to 10.16 cm). In a preferred embodiment, the annular region of the flow tube is between $\frac{1}{2}$ inch and 1$\frac{1}{2}$ inches (1.27 cm to 3.81 cm).

The reactor 10 further includes one or more distributors 22 which distribute the first reactants into the flow tubes and the second reactants into the capillary tubelet. If co-current flow is desired in the capillary reactor, a single distributor can be used to separately disperse the first and second reactants. There are preferably two distributors 22 in the form of a first distributor plate 24 located proximate the reactor shell's first end 14 and a second distributor plate 34 located proximate the reactor shell's second end 16. In the preferred embodiment, the first distributor plate has a first end 26 and a second end 28 and the second distributor plate 34 has a first end 36 and second end 38, as shown in the cross-section diagram of FIG. 2.

The first end 26 of the first distributor plate 24 preferably having an aperture 30 therein, in communication with a source of first reactants to allow the first reactant to be passed through the first distributor plate 24. At the first distributor plate's second end 28 are a plurality of apertures 32 corresponding and positioned to allow the first reactant to be introduced into the plurality of flow tubes 18 within the shell 12. In this manner, the first reactant is dispersed through the aperture 30 at the first distributor plate's first end 26 and then radially dispersed at the second end 28 of the first distributor plate 24 through the plurality of apertures 32 and into the corresponding plurality of flow tubes 18 of the shell, as depicted in FIG. 2.

In the most preferred embodiment, the source of first reactants is a first inlet tube 39 positioned to permit introduction of the first reactants through the first distributor plate 24 and into the flow tubes. As depicted in FIG. 2, the first inlet tube 39 thus introduces the first reactants into the shell and to the first distributor plate 24 for dispersion into the flow tubes.

Referring back to FIG. 1, there is preferably provided a second distributor plate 34 located proximate the second end of the shell 16. The second distributor plate preferably extends horizontally at the shell's 12 second end 16 to disperse a second reactant in each of the capillary tubelets 20. The second distributor plate 34 is preferably in communication with a source of second reactants permit the introduction of the second reactants in each of the capillary tubelets 20, through the plurality of apertures 21 formed therein so that the second reactant can be sparged from the apertures in the capillary tubelet 20 to permit the second reactant to flow from the capillary tubelets 20 and into the flow tube 18 wherein the first reactant is flowing. In this manner, the first reactant is sparged into the one or more flow tubes for reaction with the first reactant, to create a polymer product.

As more readily depicted in FIG. 2, the second distributor plate 34 also preferably has a first end 36 and a second end 38. The first end 36 of the second distributor plate 34 preferably has an aperture 40 therein, positioned in communication with a source of second reactants to allow the second reactant to pass through the second distributor plate 34. At the second distributor plate's second end 38 are a plurality of apertures 42 corresponding to and positioned to allow the second reactants to be introduced into the capillary tubelets 20 within the shell 12. In this manner, the second reactant is dispersed by the second distributor plate 34, through the aperture 40 at the second distributor plate's first end 36 and then radially dispersed at the second end 38 of the distributor plate through one or more apertures 42 and into the corresponding one or more capillary tubelets 20 positioned within the one or more flow tubes 18 within the shell 12. Again, the second reactant is then sparged through the plurality of apertures formed within the capillary tubelet 20 to permit the second reactant to be introduced into the flow tube 18 and into the first reactant to form a reactive admixture which then forms the desired reaction product. In this manner, the second reactant is sparged into the first reactant flow stream at various points via the apertures along the capillary tubelet and the reaction is then carried out in plug flow mode at each of the apertures.

In the most preferred embodiment, the source of second reactants is a second inlet tube 44 positioned in communication with the second distributor plate 34 to permit introduction of the second reactants through the second distributor plate and into the capillary tubelets. As depicted in FIG. 2, based on the preferred configuration of the reactor, the second reactants are introduced into the reactor shell 12 by the second inlet tube 44 which directs the second reactants through the second distributor plate 34 for dispersion into the capillary tubelets 20.

Figure 3:
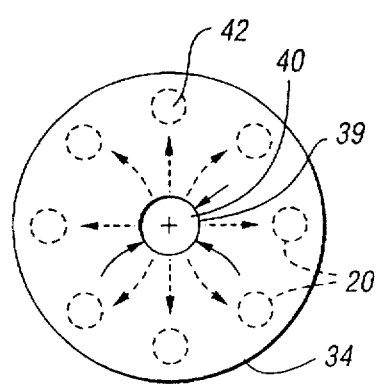
FIG. 3 illustrates a plan view of a distributor member.

A plan view of the second distributor plate 34 is depicted in FIG. 3. FIG. 3 illustrates the radial distribution resulting from the second distributor plate. As shown, a second inlet tube 44 is preferably concentrically positioned within the second distributor plate 34 and the shell 12. An aperture 40 within the second distributor plate 34 and in communication with the second inlet tube 44 is provided at the second distributor plate's first end 36. In addition, one or more apertures 42 are located within the second distributor plate's second end 38. The design of the second distributor plate thus facilitates radial dispersion of the second reactant into the one or more capillary tubelets. Likewise the design of the first distributor plate allows radial dispersion of the first reactant into the one or more flow tubes.

In a preferred embodiment, the flow rates for the reactants vary from 100 pounds per hour to 50,000 pounds per hour (45.5 Kg to 22,727 Kg per hour). For a laboratory reactor 100–500 pounds per hour is a proper flow rate. In contrast, for a commercial reactor, flow rates in the order of 5,000–50,000 pounds per hour are more appropriate (2,272 Kg to 22,727 Kg per hour).

Additionally, to insure that the second reactants flow from the apertures in the capillary tubelet and into the first reactant, a pressure differential needs to be created between the flow tubes and the capillary tubelets. Accordingly, the first and second reactants are pressurized when injected into the reactor. The pressures at which the first and second reactants may be maintained ranges from 100 psi to 300 psi, lower and higher pressures are of course suitable for particular applications. To insure that the reaction between the first and second reactants occurs in the flow tubes and that the reactive admixture is produced and withdrawn from the flow tubes, the second reactant preferably is under a greater pressure than the first reactant. The use of pressurized fluids allows the second reactant, for example, to have enough kinetic energy to eject from the apertures along the capillary tubelet rather than drip or stream therefrom. The difference in how the second reactant is delivered affects annular mixing within the flow tube. This reactor design further allows the pressure of the fluids to be distributed evenly over the entire reactor shell. Since the pressurized reactants are delivered directly into the flow tubes and capillary tubelets, the pressure exerted by the reactants is distributed over the series of welds along the flow tubes and the capillary tubelets rather than only the joints and welds of the reactor shell.

In an effort to provide heat transfer and minimize the impact of localized reaction zones, the reactor 10 preferably includes a heat transfer fluid flowing within the shell 12. In a preferred embodiment, the shell is filled with a heat transfer fluid, such as water or glycol to act as a heat sink and transfer heat from the reaction within the flow tubes to provide uniform heat conditions within the shell. In an attempt to recycle the heat transfer fluid, there is further provided a heat transfer inlet 46 to permit the introduction of a heat transfer fluid, such as a coolant, into the shell and a heat transfer outlet 48 to remove the heat transfer fluid from the reactor shell. For an exothermic reaction, for example, the reaction time is preferably only that amount of time required to obtain the desired product, otherwise with increased reaction times, the temperature in the reactor continues to rise and hot spots are formed. The use of water as a heat transfer fluid removes the heats of reaction generated from the exothermic reaction, and maintains the first and second reactant and the desired product at low temperatures. Similarly, the heat transfer fluid, can add heat to the flow tubes to maintain a uniform temperature within the reactor for endothermic reactions. In this manner, the reactor shell is capable of promoting isothermal conditions.

Lastly, an outlet tube 50 permits the removal of the desired product from within the shell 12. Once the first and second reactant have mixed together and sufficiently reacted, and the desired product formed, the product is removed from the shell through the outlet tube 50.

With this design, a reactor is provided to effectuate micro-mixing throughout the reactor. As micro-mixing has been found to be critical in the overall product quality and product distribution for polymer reactions, this reactor design is particularly useful. Additionally, this reactor design achieves micro-mixing without the use of major rotating parts such as agitators, baffles or impellers which are used in a variety of prior art reactors.

In view of the use of capillary tubelets 20 having a plurality of apertures 21 therein, radial mixing throughout the shell 12 is improved. Moreover, as the flow rates of both the first and second reactants are dispersed by first and second distributor members 22 and 34 respectively, the flow rates are dispersed in a controlled manner. In the preferred embodiment, the first and second distributor members radially disperse the first and second reactants into each of the flow tubes and/or each of the capillary tubelets respectively. With this design, the degree of radial mixing desired can be increased by adding an additional number of flow tubes and capillary tubelets.

Figure 4:
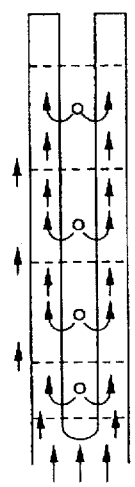
FIG. 4 illustrates the flow pattern of the reactor in FIG. 1.

Moreover, this reactor design eliminates back mixing within the shell. Referring now to FIG. 4, the first reactant moves longitudinally along the length of the flow tubes 18, the flow is generally laminar, except in minute localized zones, near the capillary tubelet apertures 21, where regional turbulence may exist. There is no back mixing of higher adducts with the lower adducts. As a result, the rates of addition of the first and second reactants are negligible and thus product sequencing of the reactants should follow their kinetic path.

As segregation of reaction zones is the key to improving micro-mixing within a reactor, this reactor design increases the degree of segregation between the multiple plug flow reactors. An even greater degree of segregation is possible by increasing the number of capillary tubelet apertures 21 and adding a longer length capillary tubelet 20. Moreover, with the use of the apertures 21 in the capillary tubelet 20, flow rates within each of the flow tubes may be changed, thus the flow directions can be altered from counter current to co-current as desired.

In addition, because the reactor does not require complex mixing equipment such as agitators, baffles or impellers, the problems associated therewith are necessarily avoided. Generally, with the use of rotating mixing devices, a vortex whirl can be created and cavitation bubbles formed. Having eliminated the need for such mixing apparatus, a simple reactor is created which achieves improved mixing.

To add to the flexibility of the reactor, the spacing of the various apertures 21 along the capillary tubelet 20, the size of the apertures, the diameter of the capillary tubelet, the diameter of the flow tube 18 can all be varied for a particular application and if desired to increase micro-mixing efficiency. These parameters should be varied to meet the requirements for a particular reaction and to further minimize the risk of localized reaction zones.

The present invention is particularly helpful in increasing the efficiency of polymerization reactions. In a preferred embodiment, the reactor is used for increasing the efficiency of polyol polyoxyalkylene reactions. Conventional polyols used, for example, in the preparation of polyurethane foams, are usually made by the reaction of a polyhydric or polyfunctional initiator with an alkylene oxide. Suitable initiators include, but are not limited to, glycerine, alkanolamines, alkylamines, aryl or aromatic amines, sucrose, sorbitol, trimethylolpropane (TMP), alpha-methylglucoside, beta-methylglucoside or other methylglucosides, resins of phenol, aniline, and their mixtures, such as methylenedianiline or the various bisphenols and the like. Preferably, the alkylene oxide has two to four carbon atoms, and is thus, ethylene oxide, propylene oxide, butylene oxide or mixtures of these oxides- Should a mixture of the oxides be used, the oxides may be mixed and then introduced into the reactor shell or separately added. The polyol is then generally made by alkoxylating the initiator with the desired number of moles of an alkylene oxide.

A catalyst is preferably used to enhance the reaction rate of the oxyalkylation. Depending on whether the polyol is to be a lower molecular weight polyol or a high molecular weight polyol, a catalyst may be selected, such as potassium hydroxide or a double metal cyanide catalyst. The catalyst may be added to the initiator before the initiator is injected into the shell or added simultaneously with the initiator as necessary.

In an alternate embodiment to further increase the continuous production of a desired product, a supplemental amount of initiator may also be added with the second reactant, i.e., along with the alkylene oxide(s), and through the capillary tubelet to provide a continuous reactive admixture.

Accordingly in a preferred embodiment, the reactor produces polyoxyalkylene polyols. To create a polyoxyalkylene polyol, the first reactant of the invention is an initiator such as the initiators outlined above. The polyol is made by reacting the initiator with an alkylene oxide. The oxyalkylation may or may not be catalyzed. If a catalyst is employed, the catalyst can be introduced with the initiator into the source of first reactants or the reactor's first inlet tube 39. For purposes of polyol production, the invention's second reactant is an alkylene oxide. In an alternate embodiment, the first reactant may be the alkylene oxide and the second reactant may be the initiator, so long as the two are isolated from one another until the two are mixed together in the flow tube.

To produce a polyoxyalkylene polyol, the initiator with or without a catalyst is preferably introduced in a first inlet tube into the shell, through a first distributor plate and into one or more flow tubes. The alkylene oxide is also introduced into the reactor in a second inlet tube, which transports the alkylene oxide to a second distributor plate which radially disperses the alkylene oxide into one or more capillary tubelets. As the alkylene oxide is dispersed into the capillary tubelets, the alkylene oxide sparges from the apertures along the capillary tubelet into its respective flow tube. In this manner, the alkylene oxide is mixed with the initiator and the desired polyoxyalkylene polyol is created.

Just as the alkylene oxide and an initiator are used to created a polyoxyalkylene polyol, other reactants and mixtures of reactants may be used to create any desired product. While the reactor is particularly suited for polymer production, the production of any chemical in which mixing plays a significant role will be enhanced with the use of this reactor.

The present invention further discloses a method for increasing the efficiency of chemical reactions. A first step involves providing a reactor with a shell having a plurality of flow tubes positioned in the shell, so that the flow tubes are connected to a source of first reactants. Within each of the flow tubes there is positioned a capillary tubelet so that each capillary tubelet is connected to a source of second reactants. Along each capillary tubelet there is formed a plurality of apertures to allow communication between the capillary tubelet and the flow tube. The reactor further includes a distributor for distributing the first reactants into the flow tubes and the second reactants into the capillary tubelets. The reactor also includes an outlet for removing the desired product.

The next step of the method involves circulating a heat transfer fluid in the shell. By circulating a heat transfer fluid in the shell, localized zones of reaction and hot spots are minimized. The first and second reactants are then allowed to react for a time sufficient to produce the desired product; and the desired product is then removed from the reactor by the outlet.

In an alternative embodiment, the flow pattern within the reactor can be reversed, such that the first reactants in the flow tubes 18 are mixed into the second reactants in the capillary tubelet 20 for reaction therein and an outlet tube is connected to the capillary tubelet 20 to facilitate removal of the product. Such a flow pattern can be feasible when the flow rates of the first and second reactants are similar. Additionally, if the reaction is not very exothermic or the heat of reaction is not very large, than the reaction can occur in the capillary tubelet because heat transfer problems are minimized due to the nature of the reaction.

This reactor design then achieves ideal mixing conditions with the use of multiple capillary plug flow reactors to increase reactant conversion and selectivity to desired products.

While the best modes for carrying out the invention have been described in detail, those familiar with the art to which this invention relates will recognize various alternative designs and embodiments for practicing the invention as defined by the following claims.

What is claimed is:

1. A chemical reactor for increasing the production of a desired product, comprising:

a. a shell;

b. a plurality of flow tubes positioned in said shell, wherein said flow tubes are connected to a source of first reactant(s);

c. a capillary tubelet positioned within and along a length of each of said flow tubes, wherein said capillary tubelet is connected to a source of second reactant(s);

d. a plurality of apertures formed along said capillary tubelet to allow communication between said capillary tubelet and said flow tube;
  e. one or more distributors for distributing said first reactant(s) into said flow tubes and said second reactant(s) into said capillary tubelets; and
  f. an outlet for removing the desired product.

2. The reactor of claim 1, further comprising a heat transfer inlet and outlet to allow a heat transfer fluid to circulate through said shell.

3. The reactor of claim 1, wherein said flow tubes are parallel to one another.

4. The reactor of claim 3, wherein said flow tubes are vertically positioned in said shell.

5. The reactor of claim 1, wherein said distributor further comprises:
   a first distributor plate proximate a first end of said shell, said first distributor plate having a first and second end, said first end having an aperture in communication with said source of first reactant(s), said second end having a plurality of apertures in communication with said flow tubes; and
   a second distributor plate proximate a second end of said shell, said second distributor plate having a first and second end, said first end having an aperture in communication with said source of second reactant(s), said second end having a plurality of apertures in communication with said capillary tubelets.

6. The reactor of claim 5, wherein said source of said first reactant(s) is a first inlet tube positioned to permit introduction of said first reactants through said first distributor plate and into said flow tubes and said source of said second reactants is a second inlet tube positioned to permit introduction of said second reactants through said second distributor plate and into said capillary tubelet.

7. A method for increasing the efficiency and production rate of a chemical reaction which takes place in a chemical reactor, said method comprising:
   selecting as said chemical reactor, the chemical reactor of claim 1.

8. A reactor for increasing polyoxyalkylene polyol production comprising:
   a. a shell;
   b. a plurality of flow tubes positioned in said shell, wherein said flow tubes are connected to a source of an initiator for a polyol polyoxyalkylation reaction;
   c. a capillary tubelet positioned in each of said flow tubes, wherein said capillary tubelet is connected to a source of alkylene oxide(s);
   d. a plurality of apertures formed along said capillary tubelet to allow communication between said capillary tubelet and said flow tube;
   e. a distributor for distributing said initiator into said flow tubes and said alkylene oxide(s) into said capillary tubelets; and
   f. an outlet for removing the polyoxyalkylene polyol.

9. A method for increasing the efficiency of chemical reactions and increasing the production of a desired product, comprising:
   a. providing a reactor, comprising:
      i. a shell;
      ii. a plurality of flow tubes positioned in said shell, wherein said flow tubes are connected to a source of first reactants;
      iii. a capillary tubelet positioned in each of said flow tubes, wherein said capillary tubelet is connected to a source of second reactants;
      iv. a plurality of apertures formed along said capillary tubelet to allow communication between said capillary tubelet and said flow tube;
      v. a distributor for distributing said first reactants into said flow tubes and said second reactants into said capillary tubelets; and vi. an outlet for removing the desired product;
   b. circulating a heat transfer fluid in said shell;
   c. allowing said first and second reactants to react for a time sufficient to produce the desired product; and
   d. removing the desired product from said outlet.

10. A process for producing chemical products without loss of selectivity, comprising:
   a. providing a reactor comprising a plurality of flow tubes within a shell capable of promoting isothermal conditions, each of said flow tubes connected to a source of first reactant(s);
   b. providing a capillary tubelet within each of said flow tubes and along a substantial fraction of the length thereof, said capillary tubelets having a plurality of apertures along the length thereof, said capillary tubelets connected to a source of second reactant(s);
   c. introducing first reactant(s) into said flow tubes;
   d. introducing second reactant(s) into said capillary tubelets;
   e. establishing a pressure differential between said flow tubes and said capillary tubelets such that transfer of said first reactant(s) or said second reactant(s) occurs through said apertures, causing said first reactant(s) and said second reactant(s) to form a reactive admixture;
   f. allowing said reactive admixture sufficient time to react to form a reaction product; and
   g. withdrawing a reaction product from said reactor.

11. The process of claim 10, wherein flow of reactants through said flow tubes is substantially plug flow.

12. The process of claim 10, wherein the pressure of said second reactant(s) in said capillary tubelets is greater than the pressure of said first reactant(s) in said flow tubes such that said reactive admixture is produced in said flow tubes and said reaction product is withdrawn from said flow tubes.

* * * * *